United States Patent Office 2,801,189
Patented July 30, 1957

2,801,189

GLASS FIBER ARTICLE AND PROCESS OF PLURAL COATED FIBER AND PROCESS OF PREPARATION

Theodore J. Collier, Newark, Ohio, assignor to Owens-Corning Fiberglas Corporation, a corporation of Delaware No Drawing. Application October 8, 1952,
Serial No. 313,783

13 Claims. (Cl. 117—72)

This invention relates to the treatment of glass fibers for use in combination with resinous materials in the manufacture of reinforced plastics and laminates and in the production of coated fabrics.

It is now well established by extensive usage and tests that glass fibers inherently possess tremendous strength properties which, coupled with their relative inertness and resistance to heat, electricity and chemicals, makes them a desirable material for use in the manufacture of plastics, laminates and coated fabrics. The difficulty resides in the inability to make full utilization of the strength properties of the glass fibers when used in combination with the resinous materials and binders in the manufacture of plastics or bonded structures.

It seems that the industry has been faced by two somewhat separate and distinct problems, the solutions of which are somewhat antagonistic in character so that, in the past, it has been necessary to make an election in favor of one property over another, as will hereinafter appear. One of the problems relates to the necessity for developing a strong bonding relation between the glass fibers and the resinous material even in the presence of water or high humidity. If the bonding relation between the resinous material and the glass fibers is weak, failure under stress has been found to result because the stresses will be incapable of transfer from fiber to fiber through the low modulus, low strength plastic matrix. If, on the other hand, the adhesion between the fibers and the resinous material is good, stress distribution can be secured so that the reinforcing action of the high modulus, high strength fibers will be more fully realized.

The problem of good adhesion between the resinous material and the glass fiber surfaces is complicated by the fact that the surfaces of the glass fibers are so smooth as to prevent the establishment of suitable anchorage by physical force and groupings which predominate on the glass fiber surfaces render the glass fibers hydrophilic in character while the majority of resinous materials used with glass fibers are resinophilic or hydrophobic so that a strong bonding relation by chemical or ionic force is also difficult to establish. Any bond which does exist is markedly reduced under high humidity conditions by a water film which preferably forms on the glass fiber surfaces to displace the resinous material.

Good adhesion of substantially permanent character has been capable of development by the use of coupling agents which react or bond strongly to both the glass fiber surfaces and the plastic material so as to tie in the resinous material with the glass fibers in a manner which is not weakened by the constituents in the environment to which the glass and plastic product may be exposed, such as to water, weak acids or bases. Coupling agents of the type which have been found suitable for developing adhesion between glass fibers and resinous materials, particularly of the unsaturated polyester type, include the Werner complex compounds wherein the trivalent nuclear chromium atom is coordinated with an acido group having from 2 to 8 carbon atoms and containing a highly functional group, such as an unsaturated carbon to carbon linkage capable of addition polymerization. The trivalent nuclear chromium atom coordinates or reacts with groupings on the glass fiber surfaces while the highly functional group of the acido radical coordinates or reacts with groups of the resinous material whereby the tie-in is accomplished. Similar results have been secured with the use of unsaturated organo-silicon compounds, such as the silanes or polysiloxanes formed thereof having an organic radical with less than 8 carbon atoms and containing a highly functional group such as described and claimed in the copending application of Lawrence P. Biefeld, Serial No. 221,512, filed on April 17, 1951, now U. S. Patent No. 2,683,097.

From the theoretical standpoint, it has been found that for best adhesion, the coupling agent must be able to react or coordinate with the groupings available on the glass fiber surfaces and it has been the practice to remove all compositions previously applied to the glass fiber surfaces in order to enhance the bonding relation. Since a freshly formed fiber has the highest strength and the most reactive surface, it is preferred to apply the coupling agent as an incidence to the glass fiber forming operations while the glass fiber surfaces are in their most reactive condition.

The other problem, antagonistic to the application of the coupling agent directly on the glass fiber surfaces, resides in the necessity for conditioning the glass fiber surfaces as with a size in order to be able to process the fibers economically through the subsequent textile operations of twisting, plying and weaving the glass fibers into the form desired for combining with the resinous material. The coupling agents which have been developed to the present are incapable of imparting the desired protection to the glass fiber surfaces and thus it has been necessary to size the glass fibers in forming to enable the fibers to be processed economically. It is this size which is subsequently removed in a separate operation for application of the coupling agent to enhance the adhesion of the resinous material subsequently combined with the glass fibers in their processed form.

Briefly described, in processing, streams of molten glass issuing from hundreds of openings in a bushing forming the bottom wall of a glass melting furnace are attenuated into filaments by mechanical drawing at speeds as high as 5,000 to 10,000 feet per minute. The size composition applied to the glass fiber surfaces to enhance subsequent processing operations is preferably applied to the group of filaments by means of a spray or wiper pads as the filaments are gathered together while still moving at a high rate of speed between the bushing and the spindle about which the filaments are wound as strands to form a package. During subsequent processing into the form used for combination with the resinous binder, the strands of fibers are unwound from the packages and twisted onto a twister bobbin from which they may be subsequently unwound onto multiple wound packages in which form they may be used to reinforce plastics. Instead the twisted strands may be plied together in opposite directions from the original twist to form a yarn from which a fabric may be woven for use in the reinforcement of plastics. In lieu of twisting the strands into yarns, the strands may be wound together on a textile "creel" into a multiple wound roving or else fed through cutters or choppers for subdivision into fiber lengths suitable for feeding to a mat forming machine.

For good handling characteristics in the various operations described, it is desirable that the treating composition embody ingredients to provide a tough flexible film forming constituent to bond the filament together in a unit pliable strand and to give the filaments abrasion resistance and a lubricant so that the fibers can move freely over surfaces contacted during processing and to avoid destruction such as by mutual abrasion. For twisting, plying and weaving, the fibers should have a size which gives greater lubricity, abrasion resistance and pliability to the strand than is required of a size applied to fibers used for the production of rovings, cutting and preparing for mat formation. In other words, the size ingredients must provide a proper balance between integrity, pliability, lubricity and a desired degree of abrasion resistance.

Size compositions which have been used in the past have been capable of formulation to impart the desired balance in handling characteristics but they have been incapable of providing the desired performance characteristics for adapting the glass fibers as a reinforcement with resinous materials. On the other hand, a coupling agent capable of imparting the desired performance characteristics has been incapable of supplying the handling characteristics of the type described for processing the glass fibers in use as a resinous reinforcement.

Therefore, it is an object of this invention to provide a method of treating glass fibers with a composition capable of imparting good handling as well as good performance characteristics.

More specifically, it is an object of this invention to provide a method for treating glass fibers and to provide compositions for use in same embodying the characteristics of a good size and a good coupling agent for application as a single composition in a single treating step onto the glass fibers in forming thereby to eliminate many of the steps heretofore required to use glass fibers with resinous material in the manufacture of plastics, laminates and bonded or coated fabrics.

It has been insufficient merely to combine coupling agents of the types described into size compositions which have heretofore been used to provide the desired handling characteristics to the glass fibers. It appears that the sugars, starches, gelatins and the like which have heretofore been used in combination with lubricating oils inhibit the performance characteristics of the coupling agents since the coupling agent is incapable then of intimate contact with the glass fiber surface or the resinous material believed necessary for strong bonding with the glass fibers and the resinous material so that sufficient adhesion is incapable of being developed between the glass fiber surfaces and resinous material for good stress distribution and for more complete utilization of the strength properties of the glass fibers as a reinforcement.

It has been discovered that the desired balance between lubricity and bonding for good handling characteristics and good adhession to improve the performance characteristics of the glass fibers can be secured in a single composition applied in a single treatment when the anchoring agent is embodied in combination with materials for providing lubricity and bonding but which are sufficiently soluble or compatible with the plastic to avoid the usual separation between plastic and glass when the size is not removed. This enables the plastic to be located immediately adjacent the glass upon combination whereby the anchoring agent is as effective as alone to tie in the plastic with the glass fiber surfaces. A further improvement which has been found to result from a system of the type described wherein the film forming constituent is soluble or compatible with the plastic material resides in the improvement resulting from more rapid and complete wetting out of the fibers with the resinous plastic material.

In accordance with the practice of this invention, a size embodying good performance as well as good handling characteristics thereby to eliminate many of the steps heretofore required in the use of glass fibers for reinforcing plastics resides in the new and novel combination of a film forming ingredient which is soluble or compatible with the resinous binder of which the plastic or fabric is formed and a coupling agent which is capable of bonding or reaction with the glass fiber surfaces and the resinous binder which, because of its solubility or compatibility with the film forming ingredient, is capable of intimate contact with the glass fiber surfaces upon application so as to enable the coupling agent to function in its intended capacity to tie in the resinous binder with the glass fiber surfaces. This concept which has been developed and established after countless experiments overcomes what is believed to be the basic reason for the inability heretofore experienced to secure good performance with many of the compositions heretofore applied embodying both a coupling agent and film forming ingredient. When the film former is incapable of solution or incompatible with the resinous binder, the coupling agent becomes sufficiently separated from the glass fiber surfaces and binder to prevent operation in the purpose for which it was intended.

To the present, best results have been secured in the use of a film forming constituent in the form of a saturated polyester resin sufficiently free of cross-linkages as to remain soluble or compatible with the binder resins, such as the unsaturated polyester resins generally used with glass fibers in the manufacture of plastics and laminates. In order to avoid cross-linking which leads ultimately to insolubility and incompatibility, it is preferred to compound the film forming polyester component of dihydric alcohols and dibasic acids, but where cross-linking can otherwise be prevented, at least until the resinous binder is applied, other polyhydric alcohols and other polybasic acids of the type generally employed in the manufacture of alkyd resins may be used. Best results have been secured by the reaction of succinic acid or anhydride with propylene glycol to form the saturated polyester but other glycols such as ethylene glycol, diethylene glycol, triethylene glycol, butylene glycol, octylene glycol, dipropylene glycol, polyethylene glycol and the like may be used, and instead of succinic acid or anhydride, other dibasic acids such as oxalic acid, malonic acid, glutaric acid, adipic acid and phthalic acids or their anhydrides may be used.

The selection of alcohols and acids depends greatly upon the degree of softness or hardness which it is desired to embody in the size composition. The degree of hardness or softness can be adjusted in a number of ways to provide a balance between performance and handling characteristics. For example, the hardness of the film forming saturated polyester resin may be increased by carrying the condensation reaction to a more advanced stage, by substitution of such dibasic acids as phthalic acid or anhydride or by substituting alcohols of shorter chain length for those of longer carbon chains, or by any combinations of the conditions defined.

In practice, the polyester is prepared by reaction separate and apart of the other ingredients of the size composition and it is preferred to carry out the reaction to a stage in which the product is slightly soluble or readily dispersible in aqueous medium so as to enable combination with the other ingredients in an aqueous system to form the size.

The following will illustrate the formulation of a saturated polyester free of cross-linking which may be used in compounding a size composition embodying good performance and good handling characteristics upon application to the glass fibers in forming:

*Example 1*

| | Grams |
|---|---|
| Succinic anhydride | 1700 |
| Propylene glycol | 1400 |
| Triphenyl phosphite | 1.67 |

The materials are combined and reacted with stirring in a stainless steel container fitted with a tight closure having a stirrer suspended therefrom and fitted for bubbling an inert gas, such as nitrogen or carbon dioxide, through the reaction mix and also vented through a condenser to prevent loss of ingredients with the inert gas circulated through the container to maintain an inert atmosphere. Reaction temperatures of about 165° are maintained for about 8 hours and then the reaction is continued at about 200° C. until an acid number of about 25-30 is reached. The reaction at 200° C. takes about six additional hours. Reaction is then stopped by dilution to about 50 percent solids with suitable solvents, such as acetone and the like for solution or dispersion in aqueous medium with ammonium hydroxide, or the reaction may be stopped by cooling the mix to a lower temperature by other conventional means. Instead of making use of an inert atmosphere for refluxing, the ingredients may be reacted in a solvent system using about 3 percent by weight toluene or xylene.

*Example 2*

| | Grams |
|---|---|
| Succinic anhydride | 750 |
| Phthalic anhydride | 1100 |
| Propylene glycol | 1250 |
| Triphenyl phosphite | 1.67 |

Reaction is carried out under similar conditions as in Example 1 to an acid number of about 40. The hardness of the polyester formed is greater than that secured by the formulation of Example 1. Where still greater hardness is desired, the cook can be carried out to a lower acid number or else a higher ratio of phthalic anhydride may be employed.

*Example 3*

| | Mols |
|---|---|
| Adipic acid | 10 |
| Phthalic anhydride | 10 |
| Ethylene glycol | 10 |
| Diethylene glycol | 10 |
| Triphenyl phosphite | 0.05 |

*Example 4*

| | Mols |
|---|---|
| Malonic acid | 5 |
| Succinic acid | 15 |
| Diethylene glycol | 10 |
| Propylene glycol | 10 |
| Triphenyl phosphite | 0.05 |

Reaction for the above compositions may be carried out as in Example 1 to acid numbers between 20 and 30. The reaction products are somewhat soluble and readily dispersible in water.

The coupling agent which it is preferred to use in combination with the polyester resins to produce the size composition comprises a silane having from 1 to 3 readily hydrolyzable groups, such as ethoxy, methoxy, chloro, bromo or other halogen groups, and an organic group attached to the silicon atom having less than 8 carbon atoms and containing an unsaturated carbon to carbon linkage capable of addition polymerization. Instead of unsaturated carbon to carbon linkages, the silane may be formulated to contain other highly functional groups in the organic radical, such for example as the groupings defined in the Steinman Patent No. 2,552,910, capable of reaction or coordination to enhance the bonding relation with resinous materials such as unsaturated polyesters or other resins of the type polyalkyl acrylates, polystyrene, polyvinylidene chloride, polyvinyl chloride-polyvinyl acetate, phenol formaldehyde, and melamine formaldehyde. Incorporation of the silane is preferably made by addition with an aqueous medium rendered alkaline with ammonia or other alkali metal hydroxide to stabilize the silane, its hydrolysis product or condensation reaction product, possibly as a water dispersible polysiloxanol or salt but which becomes insolubilized on the glass fiber surfaces upon drying. It is preferred to make use of ammonia as the alkaline medium since polymerization is controlled to produce a polymer of lower molecular weight in a desired pH range of 4-10 with greater stability of the dispersion being secured by pH adjustment to the acid side while better adhesion results from pH adjustment to the alkaline side.

Use may also be made directly of the water soluble polysiloxanolates such as sodium vinyl polysiloxanolate or the like, or aqueous dispersions of polysiloxanes having the desired unsaturated or other functional group in the organic radical. For a more complete definition of coupling agents of the type described, reference may be had to the copending application of Lawrence P. Biefeld, Serial No. 221,512, filed April 17, 1951.

By way of still further modification, though not equivalent to the organo-silicons from a chemical standpoint, use may be made of coupling agents in the form of Werner complex compounds of the type previously described and more fully defined in the aforementioned Steinman patent which are water soluble for solution in the aqueous size composition, but which insolubilize on the glass fiber surfaces or on the sized fibers upon drying.

While it is possible to formulate and react the saturated film forming polyester to provide the desired balance between lubricity and bonding for good handling characteristics, it is more expedient to rely upon the combination of the film forming ingredients and a coupling agent with a third component in the form of a lubricant. The selection of lubricant depends greatly upon the system of the size composition. When on the alkaline side, such as within a pH range of 7-10, a lubricant stable on the alkaline side is incorporated, such for example as the polyethylene glycols, marketed under the trade name "Carbowax" by The Carbide & Carbon Chemical Corporation. Other lubricants stable on the alkaline side may be used, such as the long chain esters of the type dioctylsebacate.

When, as is preferred, the size composition is acidic in character, the fatty acid amides, cationic amines containing fatty acid chains, quaternary ammonium compounds having alkyl groups with more than 8 carbon atoms and the like may be used alone or in addition to the lubricants defined above for use on the alkaline side. Representative of such lubricants stable on the acid side are dicocodimethyl ammonium chloride, octadecyl ammonium chloride, lubricants of the type defined in the Sloan Patents No. 2,356,542 and No. 2,333,206, tetraethylene pentamine reacted to contain 5 methallyl groups as side chains substituted directly on the nitrogen group, as in RL 220 marketed by Arnold Hoffman Company, or pelargonate amide solubilized with acetic acid (RL 185A—Arnold Hoffman Company). Use may also be made of the Werner complex compounds of the type described having an acido group larger than 10 carbons such as stearato chromic chloride, silane or polysiloxane formulated to contain an organic group having more than 10 carbons, as in the Iler Patents No. 2,273,040 and No. 2,356,161.

Of the three major ingredients in the size composition embodying features of this invention, the saturated polyester free of cross-linking may range in concentration from 1 to 10 percent by weight but it is preferred to make use of the polyester in amounts ranging from 1 to 5 percent by weight of the size as applied. It will be sufficient if the coupling agent is present in amounts ranging from 0.20 to 2.0 percent by weight but preferably within the range of 0.25 to 1.0 percent by weight and if the lubricant is present in amounts ranging from 0.1 to 2.0 percent by weight of the treating composition.

The following will represent treating compositions which may be applied to glass fibers in accordance with the practice of this invention to impart good handling and performance characteristics especially in subsequent use of the glass fibers in combination with unsaturated polyesters for the manufacture of plastics and laminates:

Example 5

| | Grams |
|---|---|
| Polyester resin of Example 1 | 500 |
| Vinyltrichloro silane | 75 |
| Acetone | 250 |
| Pelargonate amide solubilized in acetic acid | 37 |
| Acetic acid | 112 |
| 28° Bé. ammonia | 132 |

The ingredients are mixed and heated until a clear solution is obtained. Then about one-half of the wateer and the ammonia are mixed and added slowly to the resin. The emulsion formed is then diluted with water up to 25,000 grams. With the ammonia and acid a stable solution is formed having a pH of about 5. The size composition has a solids content of about 2.45 percent comprising 2 percent by weight of the polyester, 0.3 percent by weight of the coupling agent and 0.15 percent by weight lubricant.

Example 6

| | Percent |
|---|---|
| Saturated polyester resin of Example 2 | 4.0 |
| Gelatin | 0.1 |
| Dicocodimethyl ammonium chloride | 0.25 |
| Sodium vinylpolysiloxanolate (SS-2D — Cowles Chemical Company) | 0.4 |
| Water | 92.5 |

The pH of the size composition is about 4.5.

Example 7

| | Percent |
|---|---|
| Saturated polyester resin of Example 3 | 2.5 |
| Carbowax 1500 | 0.5 |
| Dimethyldiethoxy silane | 0.2 |
| Water | 97.8 |
| Plus ammonia to adjust the pH of the composition to about 7–10. | |

In the above the silane is incorporated with the ammonia and a fraction of the water to form a stable solution and then the resinous materials and lubricant are emulsified in the solution followed by dilution with water to the desired amount.

Example 8

| | Percent |
|---|---|
| Saturated polyester of Example 4 | 2.0 |
| Glass fiber lubricant | 0.4 |
| Methallyl polysiloxanolate in aqueous emulsion | 0.4 |
| Water | 97.2 |
| Plus a small amount of an emulsifying agent. | |

In the above formulation the materials may be combined in any order with a fraction of the water to form a stable emulsion which can subsequently then be diluted with water to the desired percent.

Example 9

| | Percent |
|---|---|
| Polyester of Example 1 | 3.0 |
| Dioctyl sebacate | 0.3 |
| Werner complex compound (methacrylato chromic chloride | 0.25 |
| Water | 96.45 |

The materials may be combined by solution of the complex compound in the aqueous medium and then dispersion of the polyester and the lubricant in a fraction of the water followed by dilution to the desired percent. Emulsifying agents of the conventional type may be used in small amounts for purposes of stabilization of the emulsion.

By way of still further improvement, it has been found that the bonding relation between the plastic material and the glass fiber surfaces and the handling properties of the glass fibers in winding, twisting, plying and weaving may be improved by the modification of the film forming saturated polyester with an additional film forming resinous component which does not impair its solubility or compatibility with the resinous binder. Such additional resinous components may include polyvinyl acetate, styrene-ester copolymers and the like which are highly compatible with the film forming polyester of the size and the unsaturated polyesters forming the usual binders in combination with the glass fibers in the manufacture of plastic products.

The added film former appears to improve many of the desirable characteristics of the size composition and further enhances the quick and uniform wetting out of the treated glass fibers with the plastic material applied by coating or impregnation thereby to improve the production of a product in which the stress distribution is more uniform and a stronger product is secured.

When incorporated, the additional film former may replace up to 75 percent by weight of the polyester resin. When present in amounts greater than a 1 to 1 ratio, the saturated polyester functions more as a plasticizer and solubilizer for the film former and when present in amounts less than a 1 to 1 ratio, the film former functions in the manner of a hardener and toughener for the polyester to improve the abrasion resistance and bonding of the treated fibers without interfering with the lubricity or the performance characteristics of the coupling agent. The use of an added film former may be illustrated by the use of the following film former composition:

Example 10

| | Percent |
|---|---|
| Polyvinyl acetate, plasticized with 30 percent saturated polyester free of cross-linking (Example 2) | 2.5 |
| Cationic glass lubricant (Arnold Hoffman RL 185A) | 0.25 |
| Vinyltrichloro silane | 0.3 |
| Water | 96.95 |

The emulsion is adjusted to a pH of 7.6 with aqueous ammonia or other weak basic salt to control the addition polymerization of the silane and to form a stable solution thereof which becomes insolubilized upon drying.

Example 11

| | Percent |
|---|---|
| Diallyldiethoxy silane | 0.3 |
| Malonic anhydride-styrene copolymer | 1.0 |
| Saturated polyester resin | 2.0 |
| Glass fiber lubricant | 0.2 |

The materials are heated to form a clear solution and then 50 cc. of 28° Bé ammonia and 50 cc. of water are mixed and added slowly to the resin. The mixture is then added with stirring to 5000 cc. of water and then the total is diluted to about 10,000 grams.

In operation any one of the size compositions previously described may be applied onto the separate filaments as they are drawn from the bushing and gathered together to form strands which are wound upon spools to form packages. The size is allowed to air dry whereby the filaments are bonded together sufficiently to impart the desired integrity to the strands without causing the filaments in one strand to bond to filaments in other strands or to produce loose ends when unwound for twisting or for the manufacture of multiple wound rovings. In addition, the filaments in each strand are capable of sufficient relative movement for flexing to enable efficient processing in the formation of twisted yarns and woven fabrics.

Coupled with the desired handling characteristics imparted to the glass fibers, the size applied to the glass fiber surfaces appears to be sufficiently soluble or compatible with the polyester resins or other treating materials when combined to form the plastic to enable the resinous binder intimately to contact the surface of the glass so that the coupling agent can function in the manner for which it was intended to tie in the resinous binder with glass fiber surfaces without interference of the remainder of the ingredients forming the size.

As a further explanation of the phenomenon secured, it is possible that the ability to use a single treating composition for imparting good performance and handling characteristics may be supported by a further explanation. It may be that the polyester which constitutes the film forming component of the size is itself capable of functioning with the coupling agent as a coupling combination wherein the coupling agent functions immediately to anchor the film forming polyester to the glass fiber surfaces and the polyester itself attaches to the plastic by reaction or combination because of their similarity in structure and reaction to produce a composite well integrated product. If such explanation prevails, then unsaturation to a limited extent may be tolerated so long as cure and cross-linking in advance can be prevented.

It will be understood that invention resides not only in the method of treating glass fibers and the fibers resulting therefrom but also in the compositions used in the treatment of the glass fibers to improve their handling and performance characteristics and in the products formed by the treated glass fibers and the resinous materials, such, for example, as the laminates, plastics, coated fabrics and bonded structures manufactured in accordance with the practice of this invention.

It will be further understood that various changes may be made in the details of formulation, application and treatment without departing from the spirit of the invention, especially as defined in the following claims.

I claim:

1. In the process of manufacturing plastics, laminates and coated fabrics including the steps of combining a first resin with glass fibers, the improvement which comprises coating the glass fibers, in advance of the combination of the first resin and the glass fibers, with a composition consisting essentially of a film forming, saturated, thermoplastic polyester second resin free of cross linkages and in admixture with a coupling agent selected from the group consisting of a Werner complex compound and an organo-silicon compound each of which is formulated to contain an organic group attached to the silicon atom in the organo-silicon compound and coordinated with the trivalent nuclear chromium atom in the Werner complex compound and in which the organic group has an aliphatic group containing 2–8 carbon atoms and a highly functional group, said film forming component being capable of solution with the first resin whereby the coupling agent is able to function to tie in the said first resin with the glass fiber surfaces.

2. In the process of manufacturing plastics, laminates and coated fabrics including the steps of combining a first resin with glass fibers, in advance of the combination of the first resin and the glass fibers, with a composition consisting essentially of a film forming, saturated, thermoplastic polyester second resin free of cross linkages and in admixture with a coupling agent selected from the group consisting of a Werner complex compound and an organo-silicon compound each of which is formulated to contain an organic group attached to the silicon atom in the organo-silicon compound and coordinated with the trivalent nuclear chromium atom in the Werner complex compound and in which the organic group has an aliphatic group containing 2–8 carbon atoms and an unsaturated carbon to carbon group, said film forming component being capable of solution with the first resin whereby the coupling agent is able to function to tie in the said first resin with the glass fiber surfaces.

3. The process as claimed in claim 1 in which the materials are present in the treating composition in amounts ranging from 1–10 percent by weight of the film forming, saturated thermoplastic polyester second resin and 0.2–2.0 percent by weight of the coupling agent.

4. The process as claimed in claim 1 in which the treating composition applied to the glass fiber surfaces prior to combination with the first resin includes a lubricant and in which the materials are present in the composition in amounts ranging from 1–10 percent by weight of the film forming, saturated thermoplastic polyester second resin, 0.2–2.0 percent by weight of the coupling agent and 0.1–2.0 percent by weight of the lubricant.

5. The process as claimed in claim 1 in which the coupling agent comprises an organo-silane having from 1 to 3 readily hydrolyzable groups and an organic group attached directly to the silicon atom having from 2–8 carbon atoms in aliphatic arrangement and in which the organic group contains an unsaturated carbon to carbon linkage capable of addition polymerization.

6. The process as claimed in claim 1 in which the coupling agent comprises a water soluble polysiloxanolate formed of a silane containing an organic group having from 2–8 carbon atoms in aliphatic arrangement and an unsaturated carbon to carbon linkage capable of addition polymerization.

7. The process as claimed in claim 1 in which the coupling agent comprises a polysiloxane dispersed with the other ingredients and in which the polysiloxane is formed of a silane containing organic groups having from 2–8 carbon atoms in aliphatic arrangement and containing an unsaturated carbon to carbon linkage capable of addition polymerization.

8. The process as claimed in claim 1 in which the treating composition contains ammonia in amounts to adjust the pH of the composition to between 7 and 10.

9. The process as claimed in claim 1 in which the film forming polyester second resin is modified with a thermoplastic resin compatible with the polyester and selected from the group consisting of polyvinyl esters, polyamines and polyester-styrene copolymers in the ratio of 25–75 parts by weight of the film forming second resin to 75–25 parts by weight of the thermoplastic resin.

10. The process as claimed in claim 1 in which the film forming polyester second resin is formed by the reaction of a saturated dibasic acid with a saturated dihydric alcohol in substantially equimolecular proportions to an acid number between 20 and 40.

11. In a structure formed of glass fibers combined with a first resinous material, the improvement which comprises a coating on the glass fibers separate and apart from said first resin for anchoring the first resinous material to the glass fiber surfaces in which the coating consists essentially of a film forming saturated thermoplastic polyester second resin free of cross linkages and a coupling agent selected from the group consisting of a Werner complex compound and an organo-silicon compound, each of which contains an organic group attached to the silicon atom in the organo silicon compound and coordinated with the trivalent nuclear chromium atom in the Werner complex compound and in which said organic group has an aliphatic grouping containing from 2–8 carbon atoms and a highly functional group, said film forming second resinous component being capable of solution with the first resin whereby the coupling agent is able to function to tie in the first resin with the glass fiber surfaces.

12. In a structure formed of glass fibers combined with a first resinous material selected from the group consisting of an unsaturated polyester, polyalkyl acrylate, polystyrene, polyvinylidene chloride, vinyl chloride-vinyl acetate copolymer, the improvement which comprises a coating on the glass fiber surfaces separate and apart from said first resin for anchoring the first resinous material to the glass fiber surfaces in which the coating consists essentially of a film forming saturated thermoplastic polyester second resin free of cross linkages and a coupling agent selected from the group consisting of a Werner complex compound and an organo-silicon compound, each of which contains an organic group attached to the silicon atom in the organo silicon compound and coordinated with the trivalent nuclear chromium atom in the Werner complex compound and in which said organic group has an aliphatic grouping containing from 2–8 carbon atoms and a highly functional group, said film forming second resinous component being capable of solution with the first resin whereby the coupling agent is able to function to tie in the first resin with the glass fiber surfaces.

13. In a structure formed of glass fibers combined with a first resinous material selected from the group consisting of phenol formaldehyde and melamine formaldehyde, the improvement which comprises a coating on the glass fibers separate and apart from said first resin for anchoring the first resinous material to the glass fiber surfaces in which the coating consists essentially of a film forming saturated thermoplastic polyester second resin free of cross linkages and a coupling agent selected from the group consisting of a Werner complex compound and an organo-silicon compound, each of which contains an organic group attached to the silicon atom in the organo silicon compound and coordinated with the trivalent nuclear chromium atom in the Werner complex compound and in which said organic group has an aliphatic grouping containing from 2–8 carbon atoms and a highly functional group, said film forming second resinous component being capable of solution with the first resin whereby the coupling agent is able to function to tie in the first resin with the glass fiber surfaces.

References Cited in the file of this patent

UNITED STATES PATENTS

| | | |
|---|---|---|
| 2,390,370 | Hyde | Dec. 4, 1945 |
| 2,392,805 | Biefeld | Jan. 15, 1946 |
| 2,476,307 | Klein | July 19, 1949 |
| 2,563,288 | Steinman | Aug. 7, 1951 |
| 2,568,384 | Cheronis | Sept. 18, 1951 |
| 2,587,636 | MacMullen | Mar. 4, 1952 |
| 2,604,688 | Slayter | July 29, 1952 |
| 2,607,755 | Bunnell | Aug. 19, 1952 |
| 2,610,893 | Collins et al. | Sept. 16, 1952 |
| 2,683,097 | Biefeld | July 6, 1954 |
| 2,688,006 | Steinman | Aug. 31, 1954 |
| 2,723,210 | Biefeld | Nov. 8, 1955 |

FOREIGN PATENTS

| | | |
|---|---|---|
| 583,754 | Great Britain | Dec. 30, 1946 |

OTHER REFERENCES

American Dyestuff Reporter, Aug. 18, 1952, Sizes for Glass Textiles for Reinforcing Polyester Plastics, by L. P. Biefeld and T. E. Phillips.